(12) United States Patent
Cantolino

(10) Patent No.: US 6,550,264 B1
(45) Date of Patent: Apr. 22, 2003

(54) AIR CONDITIONER DISCHARGE WATER SAVER SYSTEM

(76) Inventor: Christopher Ralph Cantolino, 7704 18 Ave. NW., Bradenton, FL (US) 34209

( * ) Notice: Subject to any disclaimer, the term of this patent is extended or adjusted under 35 U.S.C. 154(b) by 0 days.

(21) Appl. No.: 10/074,704

(22) Filed: Feb. 13, 2002

Related U.S. Application Data

(60) Provisional application No. 60/316,916, filed on Sep. 1, 2001.

(51) Int. Cl.[7] ............................ F25D 21/14; F25B 47/00; B01D 15/02; B01D 24/00; B01D 24/12
(52) U.S. Cl. ............................. 62/285; 62/288; 62/291; 62/279; 210/268; 210/282; 210/293; 210/300
(58) Field of Search .......................... 62/285, 288, 291, 62/279; 210/268, 282, 293, 300

(56) References Cited

U.S. PATENT DOCUMENTS

| | | | | |
|---|---|---|---|---|
| 4,066,551 A | * | 1/1978 | Stern | 210/282 |
| 5,269,919 A | * | 12/1993 | von Medlin | 210/256 |
| 5,397,468 A | * | 3/1995 | Chomka et al. | 210/232 |
| 5,694,786 A | * | 12/1997 | Huang | 62/285 |
| 5,980,761 A | * | 11/1999 | Boissie et al. | 210/807 |
| 6,041,611 A | * | 3/2000 | Palmer | 62/286 |
| 6,182,453 B1 | * | 2/2001 | Forsberg | 62/125 |
| 6,299,765 B1 | * | 10/2001 | Fabizio | 210/169 |

* cited by examiner

Primary Examiner—William C. Doerrler
Assistant Examiner—Filip Zec
(74) Attorney, Agent, or Firm—Dorothy S. Morse

(57) ABSTRACT

A gravity-assisted water saving system, and a method for its use, that can be utilized to collect the condensate from an air conditioning system, sanitize it, and then divert it for constructive use. It has a chamber with an inclined bottom surface, a dimension slightly larger than a stack of several tablets used for sanitizing swimming pool water or bleach tablets used for laundry sanitizing purposes, a P-trap on its water inlet side that prevents corrosive fumes from entering the air conditioning system from which the condensate is derived, a removable cap sealing its top opening to prevent escape of corrosive fumes into the atmosphere, and an optional mounting bracket for enhanced stabilization. Inflow tubing connected to the chamber permits ready attachment of the present invention to an air conditioning condensate discharge pipe, while a discharge tube in an inferior position transports reclaimed water to its location of subsequent use.

20 Claims, 5 Drawing Sheets

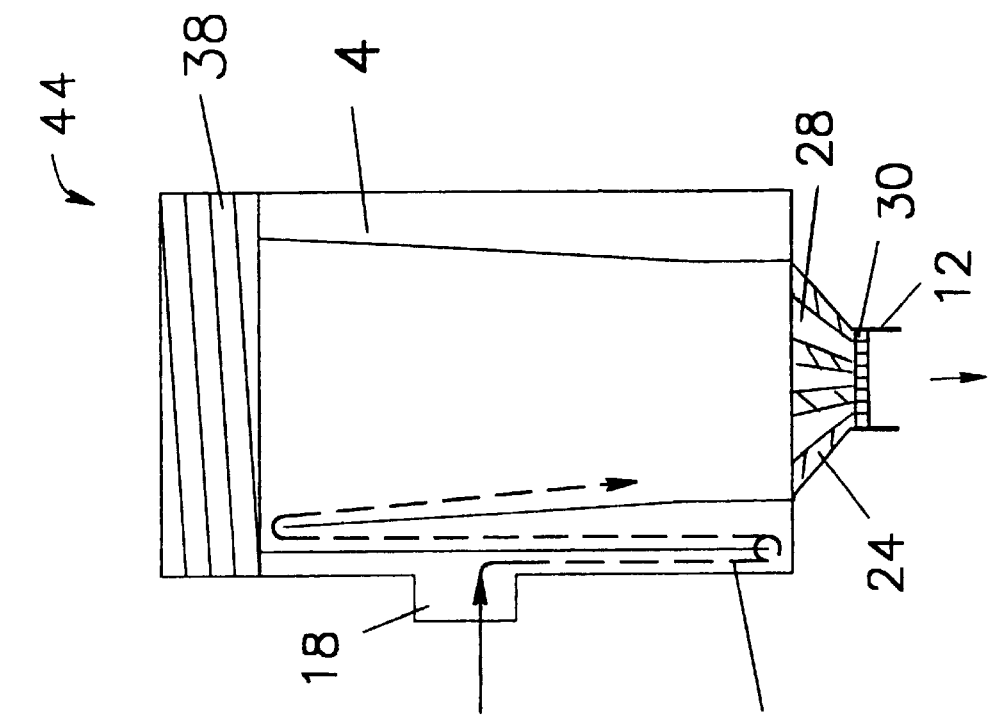
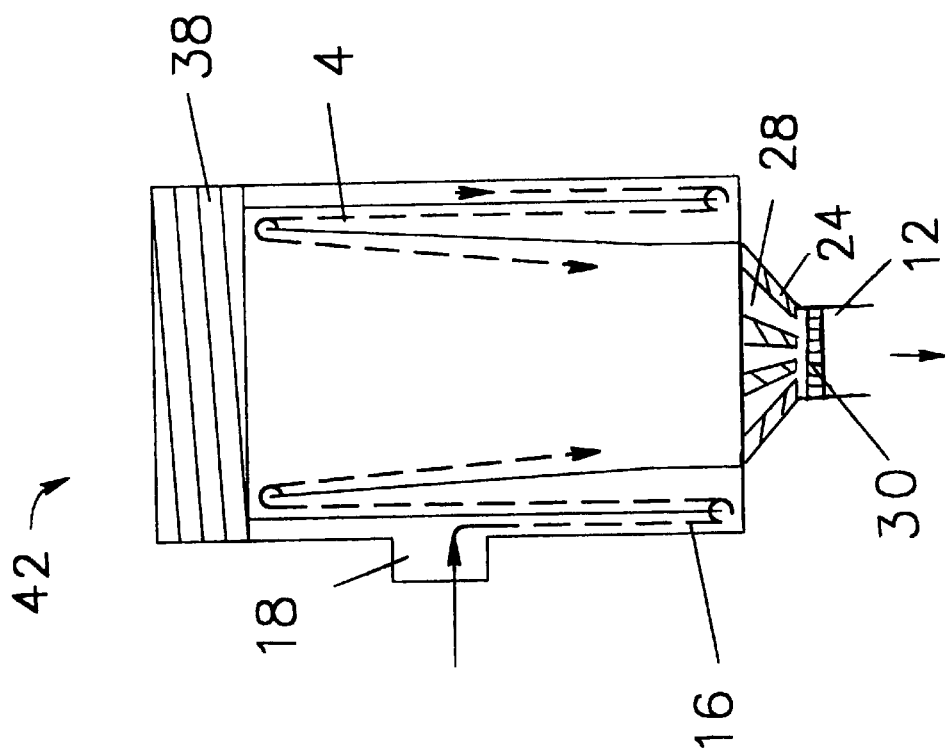

AIR CONDITIONER DISCHARGE WATER SAVER SYSTEM

This patent application is based upon U.S. provisional patent application 60/316,916, filed by the same inventor on Sep. 1, 2001, and all benefit of the provisional patent application to which the inventor is entitled, is requested herein.

BACKGROUND

1. Field of Invention

This invention relates to recovery devices for water extracted from the atmosphere, specifically to a gravity-assisted water saver system, and a method for its use, that can be connected so as to collect the condensate from an air conditioning system, sanitize it, and then divert it for constructive use.

2. Description of Prior Art

Most air conditioning condensate is an unutilized resource. The condensate extracted from air cooled by automobile air conditioning systems drips continuously in small quantities onto the pavement or parking surface beneath the associated vehicle, whereafter it evaporates into the atmosphere. Similarly, the slow drip of water extracted from the air cooled by residential air conditioning systems is typically directed to an outside location, where it is allowed to fall onto the ground under a discharge pipe for eventual evaporation. However, over time, a significant amount of condensate is produced, particularly by residential air conditioning systems. With the use of reclaimed water becoming more urgently needed and commonly accepted for an ever increasing variety of non-potable uses, as a result of the burgeoning populations and escalated depletion of potable water reserves worldwide, it would be useful to find an efficient and cost-effective means by which to reclaim air conditioning condensate and divert it to a useful purpose, such as the replacement of swimming pool water continuously being lost to evaporation so as to assure proper pump operation in associated filtration systems, toilet flushing, pressure washing, and other cleaning purposes.

One reason for a prior lack of interest in the recovery of air conditioning condensate is that by the time it is discharged from the air conditioning system, it is generally laden with bacteria and/or algae. Also, chlorinators commonly used for other purposes, such as those employed for the treatment of swimming pool water, were generally too large, too overpowering for the comparatively small amount of condensate that would require chlorination, and/or too expensive to allow easy adaptation for air conditioning condensate reclamation. However, since most homes in warm climates have air conditioning systems as well as swimming pools, and further since potable water is often used to replace the continual amount of swimming pool water lost to evaporation, a chlorinating system that could appropriately sanitize air conditioning condensate for its use as replacement water for swimming pools would preserve significant amounts of potable water and provide a benefit to the public, particularly where less groundwater depletion would be involved. For homes having air conditioning systems but not a pool, air conditioning condensate could be reclaimed for cleaning use. The present invention provides such a system and no similar invention is known, nor one that provides all of its advantages.

SUMMARY OF INVENTION

Objects and Advantages

The primary object of the present invention is to provide a sanitizing system for air conditioning condensate so that it can be reclaimed and diverted for constructive use. It is also an object of the present invention to provide a sanitizing system for air conditioning condensate that is gravity-assisted for cost-effective operation. It is a further object of the present invention to provide a sanitizing system for air conditioning condensate intended for diversion to a swimming pool, that can maintain chlorine levels sufficiently high in the condensate to kill microorganisms, including algae and bacteria, but not so high as to be inconsistent with chlorine levels needed in the recipient swimming pool. A further object of the present invention to provide a sanitizing system for air conditioning condensate and method that prevents corrosive fumes from backing up into the air conditioning system from which the condensate is derived, or from being discharged into the atmosphere. It is also an object of the present invention to provide a sanitizing system for air conditioning condensate that is adapted for use with readily available sources of chlorine products commonly employed for swimming pool water sanitization purposes, or laundry bleaching products. A further object of this invention is to provide a sanitizing system for air conditioning condensate that is easily adapted for use with different sizes of air conditioning condensate discharge pipe for prompt installation and/or retrofit to existing air conditioning systems.

As described herein, properly manufactured and used, the present invention would provide a sanitizing system for air conditioning condensate that reclaims it, treats it, and then diverts it for subsequent use instead of allowing it to be discarded as a waste by-product. The present invention can be used for new construction, as well as a retrofit unit for existing construction. When swimming pool use is contemplated for the treated condensate, the present invention would have a chlorination chamber with a substantially round cross-sectional configuration that is slightly larger than the type of chlorine tablet typically used for swimming pool water sanitization and further configured to maintain chlorine levels in the reclaimed water within a range sufficiently high for killing microorganisms, including bacteria and algae, but low enough to be consistent with levels considered acceptable for swimming pool use. When other uses for the treated condensate are contemplated, such as but not limited to flushing toilets, laundry bleaching tablets could be substituted for the swimming pool chlorine tablets, and the chlorination chamber would be adapted accordingly, either as a design consideration during manufacture or after sale with the use of one or more removable inserts. Since it is gravity-assisted and does not require the expense of a pump, the present invention is cost-effective for widespread use. To assist movement of the air conditioning condensate toward the exit opening of the chlorination chamber, the bottom surface of the chlorination chamber is inclined, downwardly tapering, or has another configuration or combination of features that uses gravity to move the condensate into temporary contact with the sanitizing means and, after an adequate amount of elapsed time when the desired amount of sanitization is achieved, to subsequently assist in the flow of treated condensate from the chlorination chamber. A P-trap on the inlet side of the chlorination chamber prevents corrosive fumes from entering the air conditioning system from which the condensate is derived, while a cap removably attached to the top of the chlorination chamber prevents hazardous fumes from escaping into the atmosphere. The removable cap is also configured to permit easy introduction of new chlorine or bleach tablets into the chlorination chamber by maintenance personnel, prevent unwanted debris from inadvertently entering the chlorination chamber, and make the chlorine or bleach tablets positioned within the chlorination chamber inconvenient for access by unauthorized persons, including children. Thus, a locking, child-resistant, or childproof cap is also considered within the scope of the present invention. Chlorination chambers made at least in part from transparent or translucent materials facilitate the monitoring of chlorine tablet usage. A tapered configuration in the distal ends of the inflow tubing and discharge tube attached to the chlorination chamber permits ready use of the present invention with different sizes of air conditioning condensate discharge pipe, as well as different sizes of tubing used to transport the reclaimed water to its intended location of use.

The description herein provides preferred embodiments of the present invention but should not be construed as limiting the scope of the air conditioning condensate chlorinating system. For example, variations in the height, inside diameter, and cross-sectional configuration of the chlorination chamber used; the type of chlorine-resistant material from which the chlorination chamber, cap, inflow tubing, and discharge tube are made; the use of ridges to direct condensate within the chlorination chamber; the configuration and dimension of any ridges used; the inside diameter dimension, length dimension, and orientation of the discharge tube; and the inclined means used for gravity assist in moving condensate from the chlorination chamber and into the discharge tube; other than those shown and described herein, may be incorporated into the present invention. Thus, the scope of the present invention should be determined by the appended claims and their legal equivalents, rather than being limited to the examples given.

BRIEF DESCRIPTION OF THE DRAWINGS

FIG. 7 is a sectional view of a fourth preferred embodiment of the present invention having a chlorination chamber with a downwardly tapering bottom surface containing a plurality of ridges, a screen, filter, and/or grid within the portion of the discharge tube adjacent to the bottom surface, a female threaded top opening in the chlorination chamber, and inflow tubing connected to an internal P-trap within the chlorination chamber that is configured distribution of air conditioning condensate on all sides of the chlorination chamber, with the flow of air conditioning condensate through the chlorination chamber being shown by a sequence of broken lines and arrowheads.

FIG. 8 is a sectional view of a fifth preferred embodiment of the present invention having a chlorination chamber with a downwardly tapering bottom surface containing a plurality of ridges, a screen, filter, and/or grid separating the ridges from the discharge tube, a female threaded top opening in the chlorination chamber, and inflow tubing connected to an internal P-trap within the chlorination chamber that is configured for distribution of air conditioning condensate only on the inflow tubing side of the chlorination chamber, with the flow of air conditioning condensate through the chlorination chamber being shown by a sequence of broken lines and arrowheads.

DETAILED DESCRIPTION OF PREFERRED EMBODIMENTS

Figure 2:
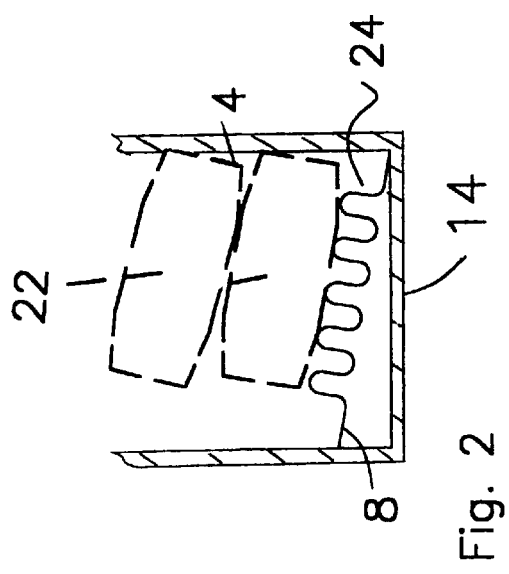
FIG. 2 is a sectional view of the bottom portion of the chlorination chamber in the first preferred embodiment of the present invention with multiple ridges supporting chlorination or bleach tablets at an inclined angle.
Figure 3:
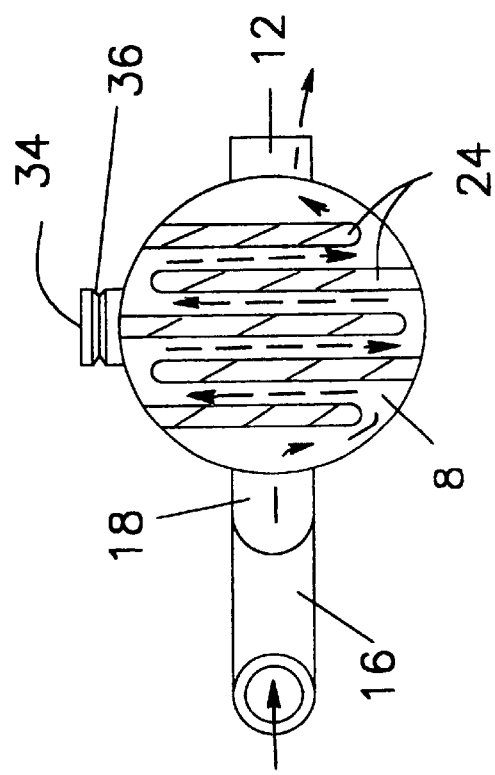
FIG. 3 is a top view of the chlorination chamber in the first preferred embodiment of the present invention with inflow tubing having a P-trap connected to one side of the chlorination chamber, a discharge tube connected to the opposed side of the chlorination chamber, a plurality of ridges in the bottom of the chlorination chamber that are used for support of a stack of chlorination or bleach tablets as well as directing condensate flow, and a mounting bracket attached to the outside surface of the chlorination chamber for enhanced chlorination chamber stabilization, with condensate flow through the chlorination chamber being shown by a sequence of broken lines and arrowheads
Figure 1:
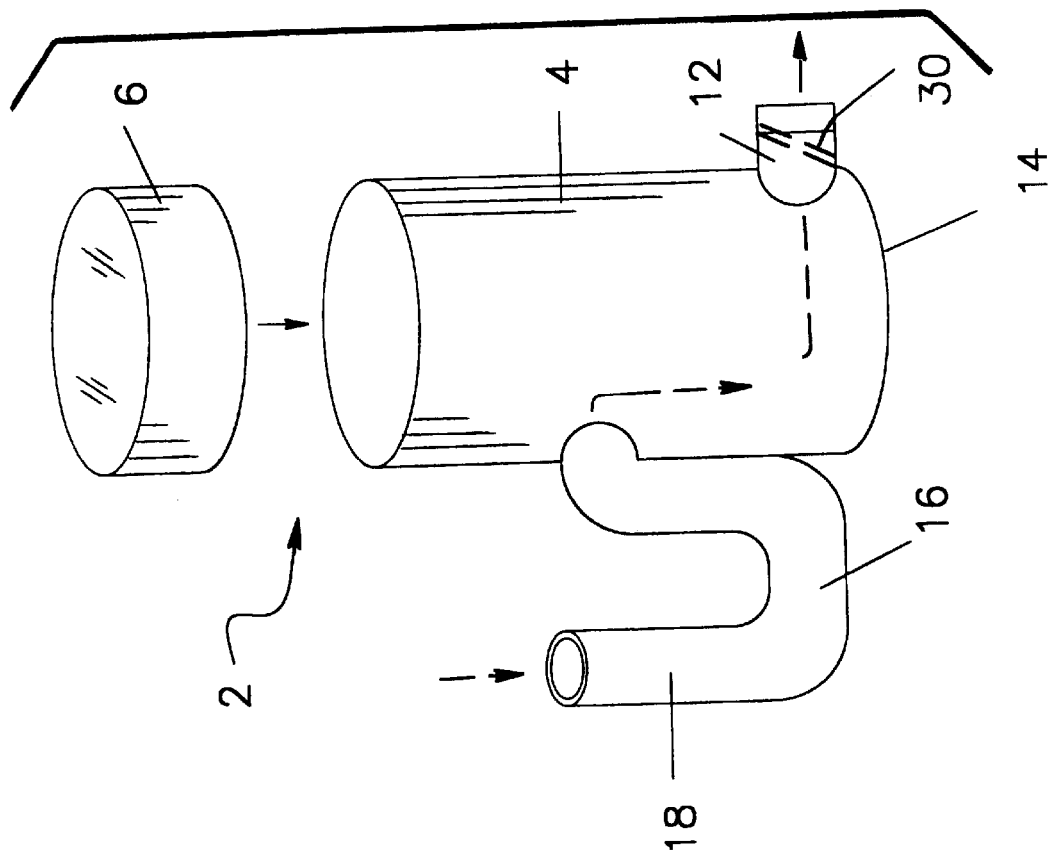
FIG. 1 is an exploded view of a first preferred embodiment of the present invention having a chlorination chamber with a top opening, a cap poised above the top opening and configured for sealing it, inflow tubing with a P-trap connected centrally through one side of the chlorination chamber, a discharge tube connected through the opposing side of the chlorination chamber near to its bottom surface, and a screen, filter, and/or grid within the discharge tube, as indicated by a pair of parallel broken lines, with the flow of air conditioning condensate through the chlorination chamber being shown by a sequence of broken lines and arrowheads.

FIGS. 1–3 show a first preferred embodiment 2 of the present invention having a hollow, substantially cylindrical chlorination chamber 4 with a top opening in its upper end and a cap 6 poised for engagement with the upper end to seal the top opening during use. Cap 6 prevents the escape of corrosive fumes from chlorination or bleach tablets used within chlorination chamber 4, such as the chlorination or bleach tablets being shown by the number 22 in FIG. 2. Cap 6 also prevents unwanted foreign objects from inadvertently entering chlorination chamber 4, such as but not limited to yard waste debris, spiders, insects, small reptiles, rodents, and rainwater. Cap 6 also provides a safety benefit by concealing chlorination or bleach tablets 22 and making them inconvenient to access by young children (not shown). In the remaining disclosure herein, for ease of description, the term chlorination tablets 22 will be used to describe any type of sanitizing means in tablet form that is configured for insertion within chlorination chamber 4 and fulfilling the intended function of treating the bacteria-laden air conditioning condensate to make it safely usable for other purposes. The means of connecting cap 6 to chlorination chamber 4 is not critical, and although FIG. 1 only shows cap 6 as a snap-fit type of cover, its configuration may include other types of seals, such as various types of plugs having a threaded connection such as plug 20 shown in FIG. 4, or a cap with female threads (not shown) configured for mated connection with the male threads on the outside surface of the upper end of chlorination chamber 4, childproof caps (not shown), hinged covers (not shown) and covers having other selectively restrictive connection means, including locking mechanisms (not shown). Also, the seal between cap 6 and the upper end of chlorination chamber 4 should be secure, but not unduly difficult for an adult to open so as to not frustrate or otherwise interfere with maintenance activity. Although the substantially cylindrical shape and circular cross-sectional configuration of chlorination chamber 4 is preferred for reduced manufacturing cost considerations, as well as for the fact that it most closely approximates the perimeter configuration of the type of tablet commonly available for swimming pool chlorination use and contemplated for use in chlorination chamber 4, such as chlorination tablets 22 shown in FIGS. 2, 6, and 10, the circular cross-sectional configuration of chlorination chamber 4 is not critical and other cross-sectional configurations are contemplated, such as but not limited to that of a pentagon, hexagon, octagon, or dodecagon. As mentioned above, although not shown, bleach tablets used for laundry purposes or other types of sanitizing tablets could be substituted for the chlorination tablets 22 used for treating swimming pools, depending upon the intended application of the treated air conditioning condensate, with the hollow interior of chlorination chamber 4 being adapted in size, if necessary during manufacture or in the alternative after sale, such as through the use of removable inserts (not shown, but which could be configured similarly to the bottom surface 8 and ridges 24 shown in FIGS. 2 and 3). The height dimension of chlorination chamber 4 is also not critical. For practical considerations and reduced maintenance of first preferred embodiment 2, it is preferred for the height dimension of chlorination chamber 4 to be sufficient for containing a stack of at least two to three chlorination tablets 22, and a maximum of approximately five to six chlorination tablets 22. Further, even though chlorination chamber 4 is configured to contain four or five chlorination tablets 22, it can be effectively operated with just one chlorination tablet 22 at a time, although operation with only one chlorination tablet 22 at a time would increase the monitoring and maintenance activity required by an operator. With the size of the air conditioning system (not shown) to which chlorination chamber 4 is connected being taken into consideration, as well as the humidity levels anticipated in the structure being cooled and atmospheric humidity levels in the climate within which the chlorination chamber 4 is being used, it is preferred for the height of chlorination chamber 4 to adequately accommodate a sufficient number of chlorination tablets 22 for it to operate for approximate periods of six months to one year without the need for introduction of additional chlorination tablets 22. Further, for maintenance assistance, although not limited thereto, chlorination chamber 4 could be made from translucent, transparent, or partially transparent materials so that an operator (not shown) could assess with one quick glance the need for additional chlorination tablets 22.

FIG. 1 also shows inflow tubing 18 with a P-trap 16 connected through the outside wall of chlorination chamber 4, in a position approximately half of the vertical distance between the top opening in its upper end and its closed bottom end 14. FIG. 1 further shows discharge tube 12 connected through chlorination chamber 4 in a position inferior to and opposed from the connection of inflow tubing 18. P-trap 16 must have sufficient height to prevent corrosive vapors released from chlorination tablets 22 from back flowing through inflow tubing 18 and entering the associated air conditioning system (not shown) where such vapors would cause damage. The vertical height at which inflow tubing 18 is connected to chlorination chamber 4 is not critical, as long as the inflow of air conditioning condensate, shown by arrowheads and broken lines in FIG. 1, is in a superior position to the bottommost chlorination tablet 22. Optionally, it is anticipated for inflow tubing 18 to be attached to chlorination chamber 4 approximately at the boundary wherein the second lowest chlorination tablet 22 in a stack rests upon the bottommost chlorination tablet 22, similar to the relative positioning between inflow tubing 18 and chlorination tablet 22 shown in FIG. 6. In the preferred embodiment 2 shown in FIGS. 1–3, it is also contemplated for the diameter of the hollow interior of chlorination chamber 4 to be sufficiently greater in perimeter dimension than the diameter of the chlorination tablets 22 used therein to prevent excessive dissolution in the side of chlorination tablet 22 facing inflow tubing 18, so that during routine operation substantially little contact will occur between the air conditioning condensate (shown by broken lines and arrowheads) as it enters chlorination chamber 4. Other measures can be taken to encourage uniform wear of the bottommost chlorination tablet 22 and minimize the amount of crumbling expected as a result of the weight of the remaining chlorination tablets 22 stacked above it, and/or the breaking off of large pieces of the bottommost chlorination tablet 22, that could block the flow of treated condensate and prevent it from expeditiously moving through discharge tube 12. One such protective measure would be to position a horizontally extending surface, similar to that shown in FIG. 6 by the number 40, within the hollow interior of chlorination chamber 4 and immediately below the bottommost edge of inflow tubing 18. Optionally, surface 40 could be channel-like and have a plurality of centrally directed and spaced-apart notches or openings, such as notches or openings 32 in FIG. 6, that progressively increase in size with an increase in distance from inflow tubing 18. The number of notches or openings 32 used in surface 40 is not critical, and when not channel-like might not contain any notches or openings 32. Thus, during periods of heavier condensate flow, surface 40 allows some of that flow to be directed toward the side of chlorination chamber 4 opposed from inflow tubing 18, where it would be more uniformly distributed for downward movement over a greater surface area within chlorination chamber 4, and result in less impact to the vertically extending side of the bottommost chlorination tablet 22 adjacent to inflow tubing 18, as well as less probability for large pieces of the bottommost chlorination tablet 22 to break off and block the outward flow of treated condensate from chlorination chamber 4. A pair of parallel broken lines within discharge tube 12 illustrates a filter, screen, or grid 30, used to prevent large pieces of partially dissolved chlorination tablets 22 from passing through the distal end of discharge tube 12, or blocking discharge tube 12 to cause the level of condensate within chlorination chamber 4 to increase and risk backing up into the air conditioning system (not shown) connected to chlorination chamber 4. The angle at which screen, filter, or grid 30 is positioned would help to prevent complete blockage of discharge tube 12. Although not shown, in first preferred embodiment 2 the distal ends of both inflow tubing 18 and discharge tube 12 could have a tapered configuration 20 so as to allow each to fit more than one size of pipe or tubing carrying the condensate to and from chlorination chamber 4. Although FIG. 1 shows the three horizontally extending broken lines in the lower portion of chlorination chamber 4, that represent condensate flow, as being substantially parallel to bottom end 14, some incline in the interior bottom surface 8, similar to that shown in FIG. 2, would be preferred to assist in the prompt gravity-aided flow of the treated condensate through chlorination chamber 4.

FIGS. 2 and 3 show chlorination chamber 4 in first preferred embodiment 2 having an inclined bottom surface 8 with five similar and approximately parallel spaced-apart ridges 24. The number of ridges 24 used is not critical. FIG. 2 also shows ridges 24 being positioned above a closed bottom end 14 and supporting two stacked chlorination tablets 22 that are shown in broken lines for clarity of illustration in distinguishing them from chlorination chamber 4. Although not shown, one or more additional chlorination tablets 22 could be placed upon the uppermost chlorination tablet 22 shown in FIG. 2, with the height of chlorination chamber 4 as well as the number of chlorination tablets 22 used depending upon the amount of condensate flow generally anticipated in the associated air conditioning system and the minimum desired time period during which it can be expected for first embodiment 2 to remain unattended between maintenance inspections. Bottom surface 8 is inclined to assist in the gravity flow of air conditioning condensate toward discharge tube 12, shown by broken lines and arrowheads in FIGS. 1 and 3. It is contemplated for bottom surface 8 to be manufactured as a molded portion of closed bottom end 14, or in the alternative as a removable insert positioned above closed bottom end 14, thereby allowing for the possibility of changes in the degree of incline, depth, and configuration of ridges 24 as a means of optimizing chlorine levels in the treated condensate flowing from discharge tube 12 and making them appropriate for the intended use. While inflow tubing 18 and discharge tube 12 have been omitted from FIG. 2 for clarity of illustration, if shown each would be placed in a similar position and orientation to the inflow tubing 18 and discharge tube 12 shown in FIG. 1. Further, although not limited thereto, for the most preferred embodiments of the present invention the optimal angle of inclination for bottom surface 8 would be approximately 10°. When treated air conditioning condensate is contemplated for addition to a swimming pool, it is contemplated for the condensate (shown by broken lines and arrowheads) traveling through the chlorination chamber 4 of the present invention to have a minimal contact with chlorination tablets 22 and achieve chlorine levels in treated water exiting chlorination chamber 4 through discharge tube 12 that are consistent with that used generally for swimming pools, as well as achieve efficient use of chlorination tablets 22. During manufacture, the height of ridges 24 can be varied and made higher or lower than the ridges 24 shown in FIG. 2, according to design considerations for differing climates and differing amounts of air conditioning condensate expected to travel through chlorination chamber 4 when associated with different sizes of air conditioning units. Although not shown, it is contemplated that one or more removable bottom inserts each having ridges 24 with a different height dimension and/or configuration could be used when it is contemplated for treated condensate to be alternatively employed for a variety of applications, such as but not limited to swimming pool refill and toilet flushing or other cleaning use. When first embodiment 2 is used, it is expected for the air conditioning condensate entering chlorination chamber 4 to come in contact almost exclusively with the lowest chlorination tablet 22 in a stack positioned therein. When contact between the lowest chlorination tablet 22 and the air conditioning condensate is evenly dispersed, substantially uniform dissolution of the lowest chlorination tablet 22 will be exhibited as the condensate is gravity-assisted through chlorination chamber 4 and beyond chlorination chamber 4 through the use of discharge tube 12. As the bottommost chlorination tablet 22 slowly dissolves with increased sanitizing use, it is expected that the upper chlorination tablets 22 in the stack will become gradually lowered in position as the second lowest chlorination tablet 22 assumes the position of the previous bottommost chlorination tablet 22 following its disintegration. Any broken pieces of the bottommost chlorination tablet 22 that might travel toward discharge tube 12 would be prevented from completely blocking discharge tube 12 by the angled screen, filter, or grid 30 positioned within discharge tube 12. The pattern of ridges 24 shown in FIG. 2 helps to achieve the minimal contact between the condensate flowing through chlorination chamber 4 and the bottommost chlorination tablet 22 so that appropriate chlorine levels in the treated condensate are achieved prior to its departure from chlorination chamber 4 via discharge tube 12, and to also help achieve substantially uniform wear of the operative and bottommost chlorination tablet 22 in the stack. The configuration of ridges 24 is not critical, and it is also contemplated for first embodiment 2 to have ridges 24 with other distal end design configurations than the rounded end configuration shown in FIG. 2, such as but not limited to beveled or square, that would be formed in bottom surface 8 to widely divert flow of the condensate in a gravity-assisted manner under the bottommost chlorination tablet 22 and then direct it out of chlorination chamber 4 via discharge tube 12.

Through the use of broken lines and arrowheads, FIG. 3 shows the flow of air conditioning condensate into inflow tubing 18 with its P-trap 16, widely directed across the bottom surface 8 of chlorination chamber 4 between ridges 24 until it reaches the opposing side of bottom surface 8 where it exits through discharge tube 12. Although FIG. 3 shows ridges 24 being parallel to one another and perpendicular to inflow tubing 18, it is not contemplated for the configuration of ridges 24 to be limited only to that shown in FIG. 3. However, ridges 24 should cause even distribution of the air conditioning condensate over bottom surface 8, so that substantially all portions of the bottom surface of the bottommost chlorination tablet 22 supported upon ridges 24 have contact with the air conditioning condensate for more uniform dissolution of the bottommost chlorination tablet 22. FIG. 3 does not show screen, filter, or grid 30 within discharge tube 12, however, the use of screen, filter, or grid 30 is preferred to prevent the risk of partially dissolved portions of chlorination tablets 22 from blocking discharge tube 12. The height and configuration of ridges 24 used would be determined by the amount of air conditioning condensate expected to enter inflow tubing 18. Although not shown, should significant seasonal differences be anticipated in the generation of air conditioning condensate or the treated condensate be alternatively diverted for new uses, the height or inclined angle of ridges 24 could be adjusted when ridges 24 are provided in the form of a removable insert that could be superimposed over existing ridges 24 or rapidly exchanged for another insert having a substitute set of ridges 24 that are positioned at a different inclined angle or height dimension as needed to achieve the minimal contact time required between the bottommost chlorination tablet 24 and the reclaimed condensate to give it the required level of sanitization appropriate to its intended use. The need for exchange of one insert for another could be determined by operator testing of the chlorine levels in the treated air conditioning condensate flowing from discharge tube 12. When the chlorine level tested is less that desired, an insert with less inclined or lower ridges 24 could be used. However, it is contemplated for the present invention to operate maintenance-free in the same application for extended periods of time, and for chemical testing of the chlorine levels in the treated condensate to not be routinely required. FIG. 3 also shows a mounting bracket 34 with an indentation 36 rearwardly depending from the present invention, for use in stabilizing it during use. Although not shown, it is contemplated for indentation 36 to engage and become secured within an opening or notch in a complementary bracket attached to a wall or other stationary object. The configuration of the complementary bracket (not shown) is not critical as long as it can securely engage indentation 36 until purposefully released.

The materials from which first preferred embodiment 2 is made can vary. However, it is critical that chlorination chamber 4, ridges 24, cap 6, inflow tubing 18, and discharge tube 12 all be made from materials resistant to direct contact with chlorination tablets 22, as well as any corrosive fumes generated by chlorination tablets 22. Also, since it is generally contemplated that the present invention will be installed outdoors and exposed to weathering elements, that the materials used for chlorination chamber 4, cap 6, inflow tubing 18, and discharge tube 12 at a minimum would be resistant to UV radiation, as well as resistant to deterioration by any other specific hazard known to exist at its intended location. Manufacture of the present invention could be accomplished by blow molding, injection molding, assembly of pre-formed individual components, or a combination thereof, with the choice of manufacturing being determined by the anticipated purchase cost to consumers and the expected time period of use without maintenance, parts replacement, or repair. Although most likely used to direct air conditioning condensate for swimming pool refill use, it is also considered to be within the scope of the present invention for the chlorinated condensate treated by chlorination chamber 4 to be collected for other appropriate purposes, such as flushing toilets, pressure washing, and other cleaning uses.

The use preferred embodiment 2, an operator (not shown) would securely position chlorination chamber 4 on a stable surface in an easy-to-access, but inconspicuous, location between the discharge tubing of an air conditioning system and a conduit or reservoir employed to reclaim the treated condensate and divert it for constructive use. Where desired, for further stabilization of chlorination chamber 4, the indentation 36 in mounting bracket 34 could be engaged with a complementary bracket attached to a wall or other stationary surface (not shown). In most applications it is preferred that the chlorination chamber 4 selected for use has a chlorination tablet 22 capacity allowing for continuous and maintenance-free operation during a time period of six months to one year. The operator would then connect the distal end of inflow tubing 18 to the discharge tubing of the air conditioning system so that surplus water vapor extracted from the cooled air can flow via gravity assistance into chlorination chamber 4. P-trap 16 prevents treated condensate within chlorination chamber 4 from reversing flow and backing up into the air conditioning system where it would be likely to cause damage. When treated condensate is contemplated for swimming pool refill use, the operator would also connect the distal end of discharge tube 12 to one end of a length of chlorine-resistant tubing, the other end of which would be placed in fluid communication with the targeted swimming pool intended for receipt of the treated condensate. It is also contemplated for the steps of connecting discharge tube 12 and inflow tubing 18 to be reversed in order. Once chlorination chamber 4 is secured in its usable position, the operator would assess the number of chlorination tablets 22 needed for uninterrupted maintenance-free operation for a time period of approximately six months to one year, or at least a minimum time period of approximately three months, and then place that number of chlorination tablets 22 in a stacked configuration within chlorination chamber 4. Minimal maintenance is contemplated. Thereafter, the operator would secure cap 6 over the top opening in the upper end of chlorination chamber 4 and determine a schedule for routine monitoring necessary to determine when replacement chlorination tablets 22 should be added. If chlorination chamber 4 is made from translucent, transparent, or partially transparent materials, between scheduled maintenance activity the operator could assess the need for additional chlorination tablets 22 with one quick glance, without removal of cap 6.

Figure 4:
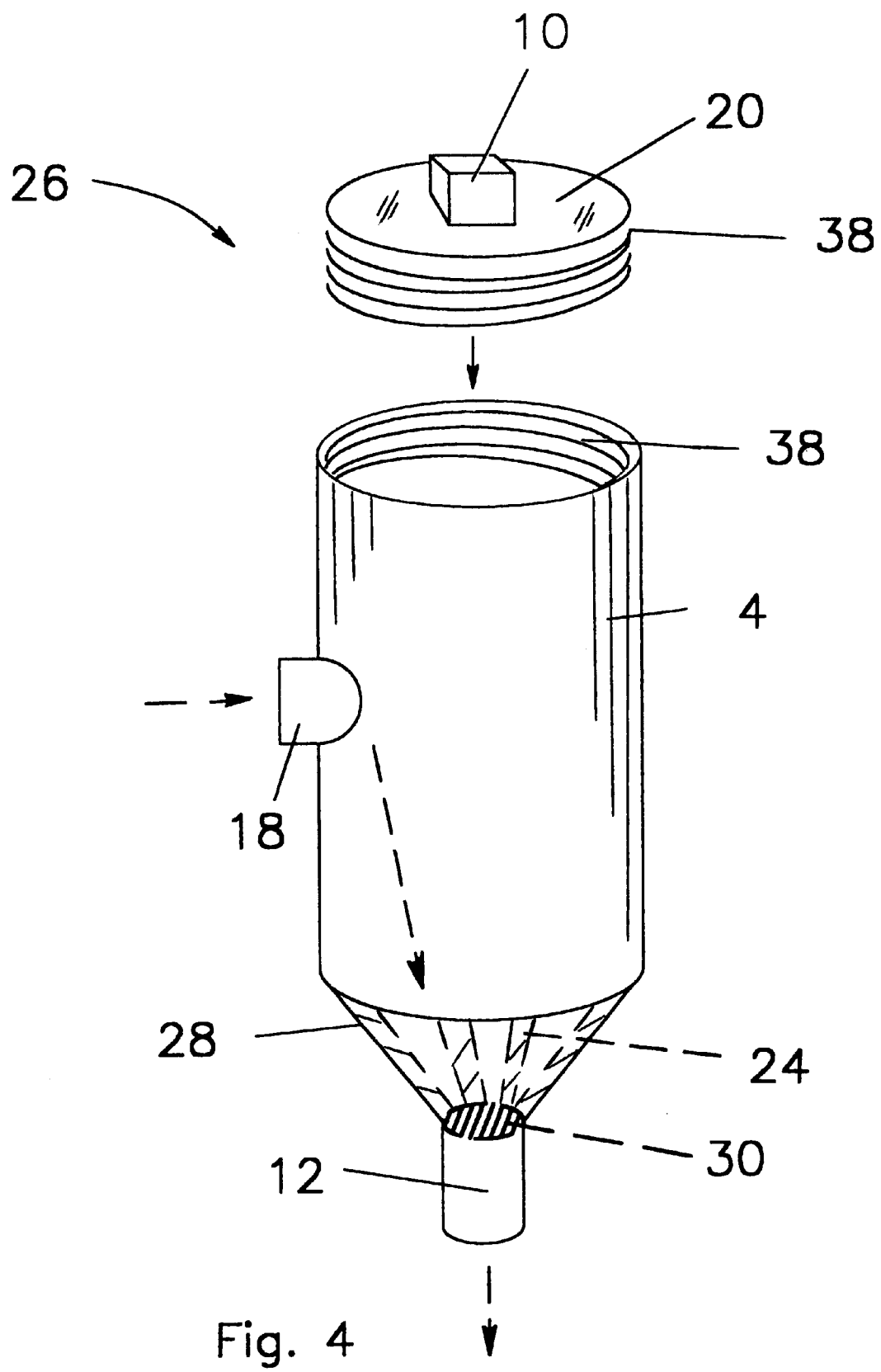
FIG. 4 is an exploded view of a second preferred embodiment of the present invention having a chlorination chamber with a top opening and a downwardly tapering bottom surface containing a plurality of ridges between it and a discharge tube, a screen, filter, and/or grid separating the ridged bottom surface from the discharge tube, a threaded cap poised above the top opening and configured for sealing it, and inflow tubing connected centrally to one side of the chlorination chamber, with the flow of air conditioning condensate through the chlorination chamber being shown by a sequence of broken lines and arrowheads.
Figure 5:
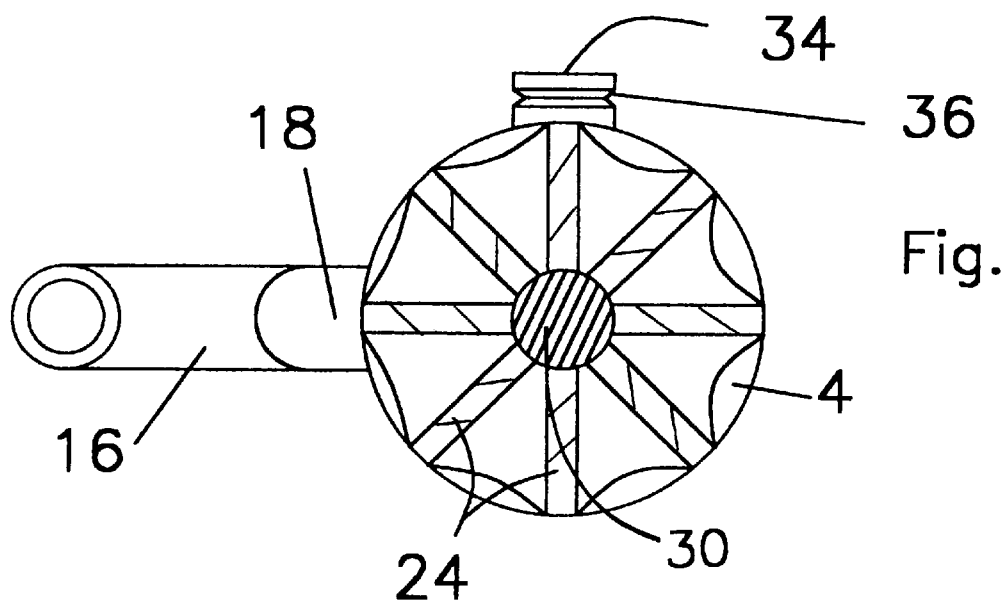
FIG. 5 is a top view of the second preferred embodiment of the present invention with inflow tubing having a P-trap connected through one side of the chlorination chamber, several radially extending ridges projecting upwardly from the bottom surface of the chlorination chamber for collectively supporting a stack of chlorination or bleach tablets, a screen, filter, and/or grid positioned centrally within the bottom surface adjacent to the interior end of each ridge, and a mounting bracket attached to the outside surface of the chlorination chamber for use in securing the chlorination chamber to a stationary surface.

FIGS. 4 and 5 show a second preferred embodiment 26 of the present invention having a chlorination chamber 4 with a top opening, an downwardly tapering bottom surface 28, and inflow tubing 18 through one side of chlorination chamber 4 that is configured for fluid communication with chlorination chamber 4. FIGS. 4 and 5 also show a plurality of radially extending ridges 24 on downwardly tapering bottom surface 28 and a filter, screen, or grid 30 centered between the lower ends of ridges 24, with ridges 24 being used to minimize contact between air conditioning condensate flowing through chlorination chamber 4 and the bottom surface of the bottommost chlorination tablet 22 within chlorination chamber 4. In addition, FIG. 4 shows a plug 20 with male threads 38 being poised above the top opening in chlorination chamber 4 and configured for sealing it. Mating female threads 38 are shown within the top opening of chlorination chamber 4. In the reverse, it is also contemplated for the upper end of chlorination chamber 4 to have male threads 38, and for the plug 20 to be configured as a cover with female threads 38. FIG. 4 also shows plug 20 having a handle 10. The configuration of handle 10 is not critical and can exhibit any shape that conveniently allows an operator to remove plug 20 from chlorination chamber 4 for repair or maintenance. Broken lines and arrowheads show the flow of air conditioning condensate entering chlorination chamber 4 via inflow tubing 18 and traveling downward toward ridges 24, and then further in a downwardly direction beyond discharge tube 12. Filter, screen, or grid 30 is shown in FIG. 4 as forming a part of downwardly tapering bottom surface 28, however, such positioning is not critical and it is also contemplated for filter, screen, or grid 30 to be positioned with the uppermost end of discharge tube 12, adjacent to but slightly below downwardly tapering bottom surface 28. It is contemplated for filter, screen, or grid 30 to be located relative to discharge tube 12 wherever it provides optimal protection for discharge tube 12 against partially dissolved pieces of the bottommost chlorination tablet 22 breaking off and blocking the flow of treated condensate therethrough. The size and design pattern of openings used for filter, screen, or grid 30, as well as its overall size and thickness dimension, are not critical and can vary depending upon design and price point considerations, such as but not limited to, ease of manufacture, the amount of condensate flow anticipated from the air conditioning system (not shown) to which it is contemplated for the present invention to be connected, and the chlorine levels needed in the treated condensate (not shown) to prepare it for its subsequent application. The height, thickness, and upper end configuration of ridges 24 are similarly variable. Plug 20 and/or chlorination chamber 4 in second preferred embodiment 26 can be made in their entirety, or in part, from transparent or translucent materials, to assist an operator in determining the need for replacement chlorination tablets 22 without the removal of plug 20. FIG. 5 also shows second preferred embodiment 26 having a P-trap 16 connected to inflow tubing 18, a mounting bracket 34 attached to the outside surface of chlorination chamber 4 in a position approximately 90° opposed from inflow tubing 18, and mounting bracket 34 having at least one indentation 36 for engagement by a device or bracket (not shown) with a complementary configuration that can be attached to a stationary surface and aid in stabilization of chlorination chamber 4 during use.

Figure 6:
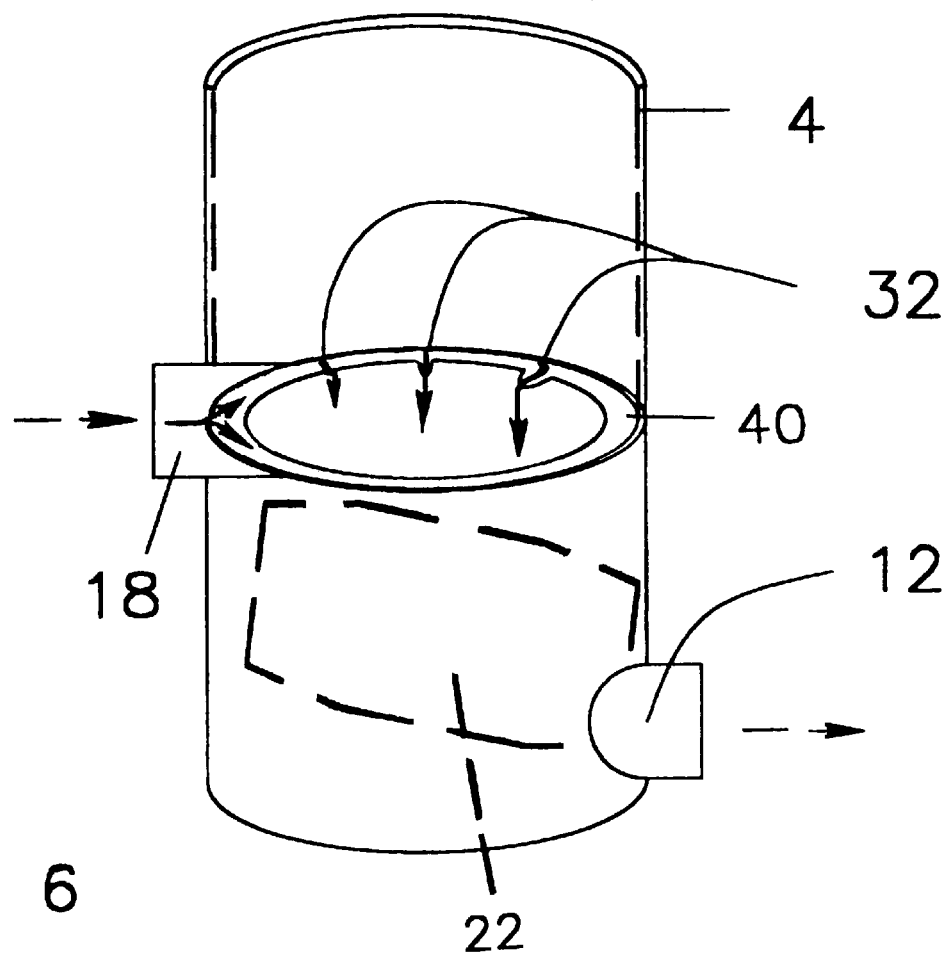
FIG. 6 is a partial sectional view of a third preferred embodiment of the present invention with a chlorination chamber having a horizontally extending interior surface that is channel-like and extends fully around the interior circumference of the chlorination chamber, the horizontally extending interior surface also being positioned immediately below the inflow tubing and having progressively larger spaced-apart openings through which heavier flows of air conditioning condensate can be more evenly distributed within the chlorination chamber to provide more uniform dissolution of the chlorination or bleach tablets positioned therein, with a chlorination or bleach tablet shown in broken lines within the chlorination chamber interior and positioned at an inclined angle between the horizontally extending interior surface and the discharge tube, and also with the flow of air conditioning condensate through the chlorination chamber being shown by a sequence of lines and arrowheads.

FIG. 6 shows chlorination chamber 4 having an optional horizontally extending water-dispersing surface 40 that can be located within chlorination chamber 4 immediately below inflow tubing 18 to promote more uniform distribution of the incoming air conditioning condensate within the interior of chlorination chamber 4, and more uniform dissolution of the side and bottom surfaces of the bottommost chlorination tablet 22. Although not shown, horizontally extending water-dispersing surface 40 could be incorporated into the upper surfaces of an insert used to adapt the hollow interior of chlorination chamber 4 to smaller sizes of chlorination tablets 22 or bleach tablets used for laundering purposes, for more uniform dissolution and increased consistency in the chlorine level found in the treated condensate. Optionally, and preferably, horizontally extending water-dispersing surface 40 would be channel-like and extend fully around the interior circumference of chlorination chamber 4. Also, it is preferred for horizontally extending water-dispersing surface 40 to be positioned at a height comparable to the approximate boundary between the two bottommost chlorination tablets 22 within chlorination chamber 4. In addition, FIG. 6 shows horizontally extending water-dispersing surface 40 having a plurality of spaced-apart notches or openings 32 that progressively increase in size with an increase in distance from inflow tubing 18, and through which heavy flows of incoming air conditioning condensate can be distributed for more uniform downward flow in relation to the bottommost chlorination tablet 22. For clarity of illustration, notches or openings 32 are only shown on the side of water-dispersing surface 40 that is remote from the viewer, however, in the preferred embodiment represented it is contemplated for a mirror image selection of notches or openings 32 to also extend across the opposing side of water-dispersing surface 40. The use of notches or openings 32 is optional, but preferred, with the relative sizes and number of notches or openings 32 not being critical, but varying according to the peaks amounts of condensate flow anticipated in a particular application. Since FIG. 6 shows chlorination chamber 4 with a discharge tube 12, FIG. 6 illustrates use of horizontally extending water-dispersing surface 40 with first preferred embodiment 2. However, it is also contemplated for horizontally extending water-dispersing surfaces 40 to be used with chlorination chambers 4 having a downwardly tapering bottom surface 28, such as second preferred embodiment 26 shown in FIG. 4. Thus, the configuration of water dispersing surface 40 is not critical or limited to that shown in FIG. 6, as long as it effectively disperses heavier flows of incoming condensate to some of the interior wall areas of chlorination chamber 4 remote from inflow tubing 18, thereby minimizing contact of incoming condensate with the side of the bottommost chlorination tablet 22 facing inflow tubing 18 that would otherwise produce uneven dissolution of the bottommost chlorination tablet 22 and a greater potential for separation of partially dissolved pieces of the bottommost chlorination tablet 22. Although screen, filter, or grid 30 is not shown in FIG. 6, its use is preferred to prevent the risk of blockage for discharge tube 12 by broken pieces of the partially dissolved bottommost chlorination tablet 22. Also, although not shown in the illustrations provided, it is contemplated for the present invention to include other embodiments in addition to first embodiment 2 and second embodiment 26, some of which may appear to comprise a blending of the features shown in first embodiment 2 and second embodiment 26, and some of which include obvious variations thereto not included in the attached illustrations.

FIGS. 7 and 8 respectively show a fourth preferred embodiment 42 and a fifth preferred embodiment 44 of the present invention, each having an internal P-trap 16. FIGS. 7 and 8 both show chlorination chamber 4 having a downwardly tapering bottom surface 28 containing ridges 24 and a top opening with female threads 38. In addition, a filter, screen, or grid 30 separates ridges 24 from discharge tube 12, and inflow tubing 18 is connected centrally through the outside wall of chlorination chamber 4. In FIG. 8 ridges 24 extend to screen, filter, or grid 30, while in FIG. 7 ridges 24 have a different configuration and do not completely extend to the entrance of discharge tube 12, with screen, filter, and grid 30 being positioned within the proximal end of discharge tube 12. When screen, filter, and grid 30 is positioned within discharge tube 12, it is contemplated that screen, filter, and grid 30, although shown in FIG. 7 approximately perpendicular to the walls of discharge tube 12, screen, filter, and grid 30 could also be placed at an oblique relative to the walls of discharge tube 12, similar to the positioning of screen, filter, and grid 30 shown in FIG. 1. Broken lines and arrowheads in FIGS. 7 and 8 show the flow of air conditioning condensate as it enters chlorination chamber 4 through inflow tubing 18, is diverted upwardly toward female threads 38 by internal P-trap 16, after which it enters the hollow interior of chlorination chamber 4 where at least one chlorination tablet 22 would be positioned during use. The bottommost chlorination tablet 22 would be supported by ridges 24, which have sufficient height to allow optimal contact between the bottommost chlorination tablet 22 and the downward flowing air conditioning condensate so as to provide the level of chlorination desired in the treated condensate for its intended application as it moves beyond chlorination chamber 4 via discharge tube 12. FIG. 7 shows the configuration of internal P-trap 16 needed for applications where heavy inflows of air conditioning condensate are anticipated, where the condensate is distributed for entering the hollow interior of chlorination chamber 4 from more than one direction. In contrast, FIG. 8 shows a P-trap 16 with a more limited configuration, for use in applications where the air conditioning system to which inflow tubing 18 is connected generates smaller amounts of condensate, and where the incoming condensate enters the hollow interior of chlorination chamber 4 only from the side through which inflow tubing 18 is connected. Further, the configuration and dimension of downwardly tapering bottom surface 28, as well as the number of ridges 24 used, are not critical, as is evident by the more narrowly tapered configuration of bottom surface 28 in FIG. 4, and the wider configuration shown in FIGS. 7 and 8. Thus, the configuration of downwardly tapering bottom surface 28 is considered to be a design choice based upon the size of chlorination chamber 4 used and the method chosen for its manufacture. Although hidden from view in FIGS. 7 and 8, it is also contemplated for any embodiment of the present invention having discharge tube 12 connected underneath chlorination chamber 4, such as second preferred embodiment 26, as well as fourth preferred embodiment 42 and fifth preferred embodiment 44, to have a mounting bracket 34 that can be used to further stabilize chlorination chamber 4 during its use.

Figure 10:
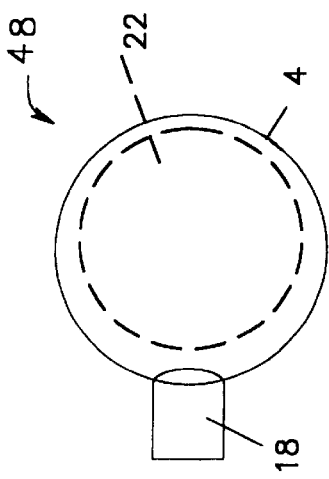
FIG. 10 is a top view of a seventh preferred embodiment of the present invention with inflow tubing connected through one side of the chlorination chamber, and a non-centralized chlorination or bleach tablet positioned at a spaced-apart distance from the inflow tubing.
Figure 11:
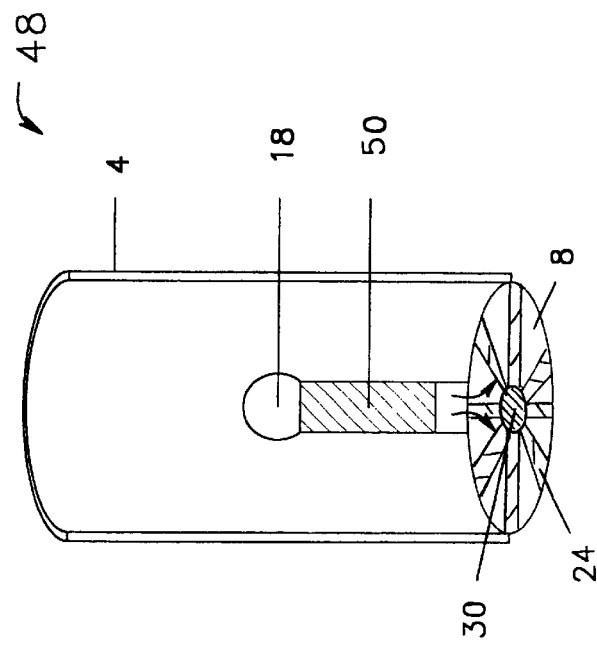
FIG. 11 is a sectional view of the seventh preferred embodiment of the present invention having a vertically extending recessed channel within the inside wall of the chlorination chamber below the inflow tubing and in fluid communication with it, with the flow of air conditioning condensate from the recessed channel downwardly toward a ridged bottom surface being shown by two diverging arrows, and a central screen, filter, and/or grid adjacent to the interior ends of the radially extending ridges.
Figure 9:
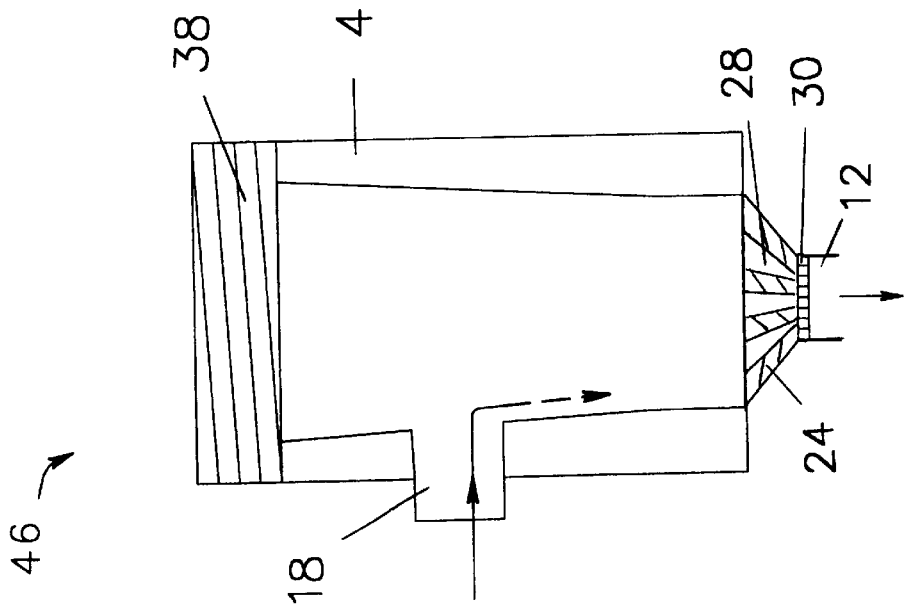
FIG. 9 is a sectional view of a sixth preferred embodiment of the present invention having a chlorination chamber with a downwardly tapering bottom surface containing a plurality of ridges, a screen, filter, and/or grid separating the ridged bottom surface from the discharge tubing, a female threaded top opening in the chlorination chamber, with no internal P-trap and the flow of air conditioning condensate through the chlorination chamber being downwardly directed and shown by a sequence of lines and arrowheads.

FIGS. 9, 10, and 11 respectively show a sixth preferred embodiment 46 and a seventh preferred embodiment 48 of the present invention, with differing means of air conditioning condensate entry into the hollow interior of chlorination chamber 4. Broken lines and arrowheads in FIG. 9 show a downward condensate flow directly into the hollow interior of chlorination chamber 4, while FIGS. 10 and 11 illustrate the configuration of chlorination chamber having a vertically extending recessed channel 50 through which the reclaimed air conditioning condensate would flow before it entered the hollow interior of chlorination chamber 4 near its bottom interior surface 8. Although not shown, both of the embodiments in FIGS. 9, 10, and 11 contemplate the use of an external P-trap 16, instead of an external one. The flow of reclaimed air conditioning condensate through the sixth preferred embodiment 46 in FIG. 9 is similar to the direct entry of condensate that would occur in the second preferred embodiment 26 shown in FIG. 4. However, the configuration of the downwardly tapering bottom surface 28 in the sixth preferred embodiment 46 shown in FIG. 9 resembles the less elongated and wider configuration of bottom surface 28 shown in FIGS. 7 and 8. In all other respects, FIG. 9 is similar to second preferred embodiment 26, with FIG. 9 showing chlorination chamber 4 having a top opening with female threads 38, inflow tubing 14 connected centrally through the outside surface of chlorination chamber 4, downwardly tapering bottom surface 28 having a plurality of ridges 24, and a filter, screen, or grid 30 below ridges 24 and separating ridges 24 from discharge tube 12. In contrast, FIG. 11 shows a vertically extending recessed channel 50 within the inside wall of chlorination chamber 4, immediately below inflow tubing 18 and in fluid communication with it. FIG. 11 also shows recessed channel 50 having a bottom opening with arrows showing condensate flow therefrom and downwardly onto the inside bottom surface 8 of chlorination chamber 4, where ridges 24 would support a chlorination tablet, such as chlorination tablet 22 shown in FIG. 10, and further direct treated condensate downwardly toward screen, filter, or grid 30. The length and width dimensions of recessed channel 50 are not critical, and would depend upon the anticipated amounts of condensate generated by the air conditioning system (not shown) to which the seventh preferred embodiment 48 is connected during use. Further, the number, orientation, and configuration of ridges 24 in seventh preferred embodiment 48 are not critical, and would depend upon the optimal chlorine levels needed in the treated condensate for the proposed application. Different chlorination chambers 4 could be manufactured with bottom surfaces 8 having a distinguishable number, orientation, and/or configuration of ridges 24, that could be substituted for one another when greater or lesser amounts of contact time between the bottommost chlorination tablet 22 and the recovered condensate are desired according to changing application requirements. In the alternative, removable inserts (not shown) for chlorination chamber 4, each insert having different numbers, orientations, and/or configurations of ridges 24, could be used to provide operators (not shown) with the ability to more precisely control chlorine levels in condensate discharged from chlorination chamber 4 and satisfy changing application requirements. FIG. 10 shows seventh preferred embodiment 48 of the present invention with inflow tubing 18 connected through one side of chlorination chamber 4 and a non-centralized chlorination tablet 22 positioned away from inflow tubing 18. Chlorination tablet 22 is shown in broken lines for clarity of illustration in distinguishing it from chlorination chamber 4. By positioning one or more stacked chlorination tablets 22 at a distance from inflow tubing 18, similar to the stacking shown in FIG. 2, the reclaimed condensate will have some dispersion within chlorination chamber 4 prior to contact with the bottommost chlorination tablet 22, allowing for more uniform dissolution of each successive chlorination tablet 22 as it becomes lowered into the bottommost position within chlorination chamber 4. The positioning of chlorination tablet 22 shown in FIG. 10 would also be useful during use of the sixth preferred embodiment 46 in FIG. 9, so that air conditioning condensate entering the hollow interior of chlorination chamber 4 would have less opportunity for contact with the vertically extending side surfaces of the bottommost chlorination tablet 22. In contrast, chlorination tablets 22 placed within an embodiment of the present invention having the optional horizontally extending water-dispersing surface 40 shown in FIG. 6 would benefit from a more centralized positioning.

Although not limited thereto and provided only by way of example, the preferred embodiments shown in FIGS. 1–11 could have one or more of the following dimensions. When chlorination chamber 4 has a vertical height of approximately six inches, a cylindrical configuration, an inside diameter of approximately four inches, and a wall thickness of approximately one-half inch, it is contemplated for P-trap 16 to have a vertical depth of approximately four inches. Further, both inflow tubing 18 and discharge tube 12 could be made from three-fourths inch PVC pipe. Also, for most purposes, the angle of inclination for the interior bottom surface 8 of chlorination chamber 4 would be approximately 10°, however, the angle could be varied during manufacture, or with the use of replaceable inserts, depending upon the need to have greater or lesser concentrations of chlorine in the treated condensate according to the intended use. Further, although not limited thereto, it is contemplated for the pattern of ridges 24 shown in FIG. 3 to have a width dimension of approximately three-tenths of an inch, with the spaced-apart distance between ridges 24 also being approximately three-tenths of an inch. Also, in the pattern of ridges 24 shown in FIG. 3, it is contemplated for the gaps between the unattached end of each ridge and the inside wall of chlorination chamber 4 to be less than one-half inch.

I claim:

1. A gravity-assisted sanitizing system for air conditioning condensate that collects it, treats it, and diverts it for constructive applications, said system comprising:
   a plurality of dissolvable tablets each adapted for slow dissolution and sanitizing of water containing bacteria and algae;
   a chamber adapted for housing a vertical stack of said tablets as well as periodic introduction of additional ones of said tablets into said chamber as tablets in said stack become consumed by sanitizing use;
   fluid entry means adapted for collecting and transporting air conditioning condensate into said chamber, and further adapted for preventing any corrosive vapors from said tablets from entering the air conditioning system from which the condensate was derived;
   fluid exit means adapted for transporting sanitized air conditioning condensate from said chamber; and
   filtering means in close proximity to said fluid exit means and adapted to prevent separated pieces of partially dissolved ones of said tablets from blocking flow of sanitized air conditioning condensate from said chlorination chamber, whereby through use of said system previously discarded air conditioning condensate can be collected and diverted for a useful purpose, instead of being discarded as a waste by-product.

2. The system of claim 1 wherein said filtering means is selected from a group consisting of filters, screens, and grids.

3. The system of claim 1 wherein said fluid entry means comprises a P-trap.

4. The system of claim 3 wherein said P-trap is selected from a group consisting of external P-traps, internal P-traps directing condensate to only one side of said chamber, and internal P-traps directing condensate to more than one side of said chamber.

5. The system of claim 1 wherein said tablets are selected from a group consisting of swimming pool chlorination tablets and bleach tablets.

6. The system of claim 1 wherein said fluid exit means is selected from a group consisting of downwardly tapering bottom surfaces and inclined bottom surfaces.

7. The system of claim 1 wherein said chamber has a top opening sufficiently large for insertion of one of said tablets, and further comprising sealing means for said top opening.

8. The system of claim 7 wherein said sealing means is selected from a group consisting of caps, plugs, threaded plugs, and plugs with handle means.

9. The system of claim 1 further comprising a vertically extending recessed channel in said chamber that is in fluid communication with said fluid entry means, said recessed channel being adapted for downward flow of condensate prior to its entry into said chamber.

10. The system of claim 1 wherein said chamber has an outer surface and further comprising mounting means connected to said outer surface, said mounting means being adapted for enhanced stabilization of said chamber.

11. The system of claim 1 further comprising a horizontally-extending condensate dispersion means in fluid communication with said fluid entry means.

12. The system of claim 11 wherein said chamber has an interior circumference and said condensate dispersion means comprises a channel extending fully around said interior circumference, said channel having a plurality of spaced-apart openings that progressively increase in size with an increase in distance from fluid entry means.

13. A gravity-assisted sanitizing system for air conditioning condensate that collects it, treats it, and diverts it for constructive applications, said system comprising:
   a plurality of slow dissolving tablets each having a diameter dimension and consisting of releasable chemicals used for sanitizing water containing bacteria and algae;
   a chlorination chamber having a top opening, a hollow interior, a diameter slightly larger than said diameter dimension of said tablets, and a height dimension sufficient to house a vertical stack of said tablets that would permit operation of said system without maintenance for a minimum period of approximately three months;
   fluid entry means adapted for collecting and transporting air conditioning condensate into said hollow interior of said chlorination chamber, said fluid entry means having a P-trap configured for preventing any corrosive vapors from said tablets, when said tablets are placed within said chlorination chamber, from entering the air conditioning system from which the condensate is derived;
   removable cover means adapted for sealing said top opening in said chlorination chamber, protecting said hollow interior from intrusion of unwanted debris, and preventing any corrosive vapors from said tablets from escaping into the atmosphere surrounding said chlorination chamber;
   fluid exit means adapted for transporting air conditioning condensate from said chlorination chamber; and
   filtering means in close proximity to said fluid exit means and adapted to prevent large separated pieces from partially dissolved ones of said tablets from blocking flow of sanitized air conditioning condensate from said chlorination chamber whereby through use of said system previously discarded air conditioning condensate can be recovered and diverted for a useful purpose.

14. A method for recovering and sanitizing air conditioning condensate, said method comprising the steps of:
   providing a plurality of slowly dissolving tablets each adapted for sanitizing of water containing bacteria and algae, a chamber adapted for housing a vertical stack of said tablets and a top opening, cover means adapted for sealing said top opening, fluid entry means adapted for collecting and transporting air conditioning condensate into said chamber, said fluid entry means being further adapted for preventing any corrosive vapors from said tablets from entering the air conditioning system from which the condensate was derived, fluid exit means adapted for transporting sanitized air conditioning condensate from said chamber; and filtering means in close proximity to said fluid exit means, said filtering means being adapted to prevent separated pieces of partially dissolved ones of said tablets from blocking flow of air conditioning condensate from said chlorination chamber;

positioning said chamber in an up-right position;

using said fluid entry means to place said chamber in fluid communication with the condensate discharge tubing of an air conditioning system;

using said fluid exit means to place said chamber is fluid communication with a receiving system capable of collecting and diverting sanitized condensate for constructive use;

inserting at least one of said tablets through said top opening in said chamber; and using said cover means to seal said top opening, whereby upon generation of air conditioning condensate, such condensate is collected, sanitized by contact with the bottommost one of said tablets, and diverted for a useful purpose instead of being discarded as a waste by-product.

15. The method of claim 14 wherein said filtering means is selected from a group consisting of filters, screens, and grids, and further wherein said fluid entry means comprises a P-trap and said P-trap is selected from a group consisting of external P-traps, internal P-traps directing condensate to only one side of said chamber, and internal P-traps directing condensate to more than one side of said chamber.

16. The method of claim 14 wherein said tablets are selected from a group consisting of swimming pool chlorination tablets and bleach tablets and further wherein said fluid exit means is selected from a group consisting of downwardly tapering bottom surfaces having a plurality of ridges and inclined bottom surfaces having a plurality of ridges.

17. The method of claim 14 wherein said chamber has a top opening and further comprising sealing means selected from a group consisting of caps, plugs, threaded plugs, and plugs with handle means.

18. The method of claim 14 further comprising a vertically extending recessed channel in said chamber that is in fluid communication with said fluid entry means, said recessed channel being adapted for downward flow of collected condensate prior to the condensate entering into said chamber.

19. The method of claim 14 wherein said chamber has an outer surface and further comprising mounting means connected to said outer surface, said mounting means being adapted for enhanced stabilization of said chamber, and further comprising a step of securing said mounting bracket to a stationary object to further stabilize said chamber during use.

20. The method of claim 14 wherein said chamber has an interior circumference and further comprising a horizontally-extending condensate dispersion channel extending fully around said interior circumference and in fluid communication with said fluid entry means, said channel having a plurality of spaced-apart openings that progressively increase in size with an increase in distance from fluid entry means.

* * * * *